L. FERRIS.
DIGGER.
APPLICATION FILED MAY 20, 1910.
969,613.
Patented Sept. 6, 1910.
2 SHEETS—SHEET 2.
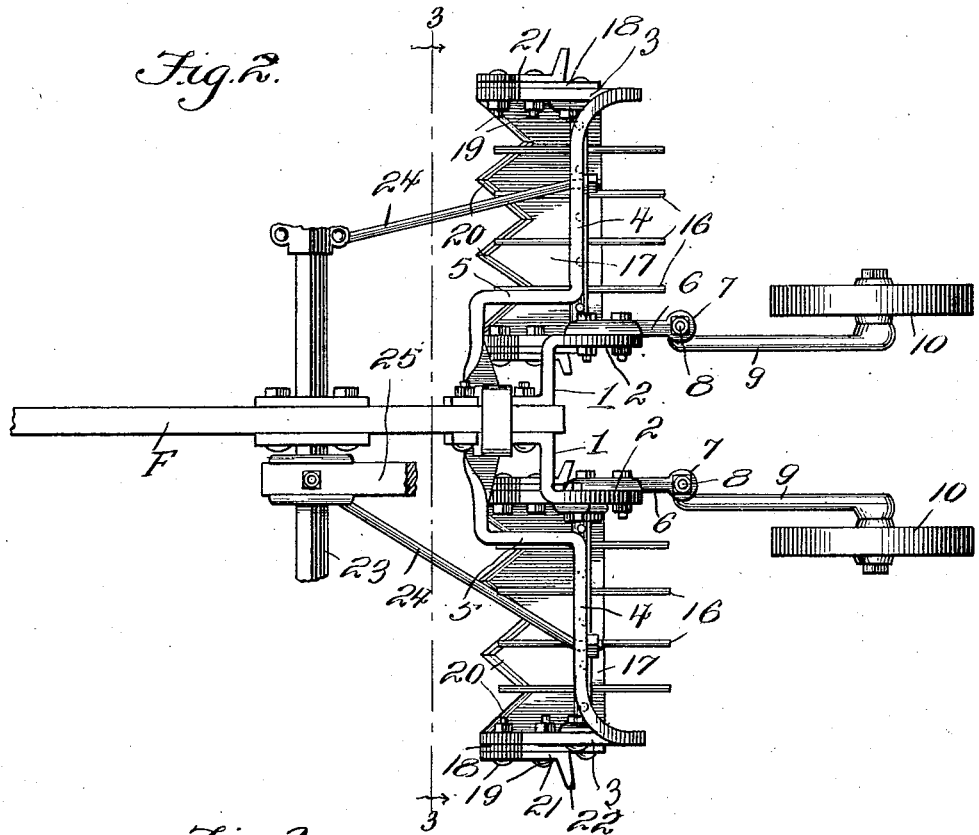
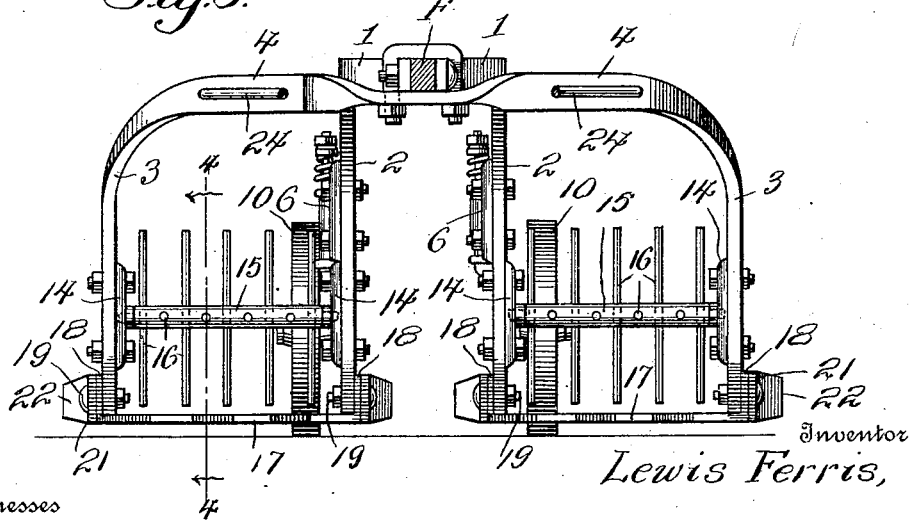
Witnesses
J. T. L. Wright
Wm. Bagger
Inventor
Lewis Ferris,
By Victor J. Evans,
Attorney

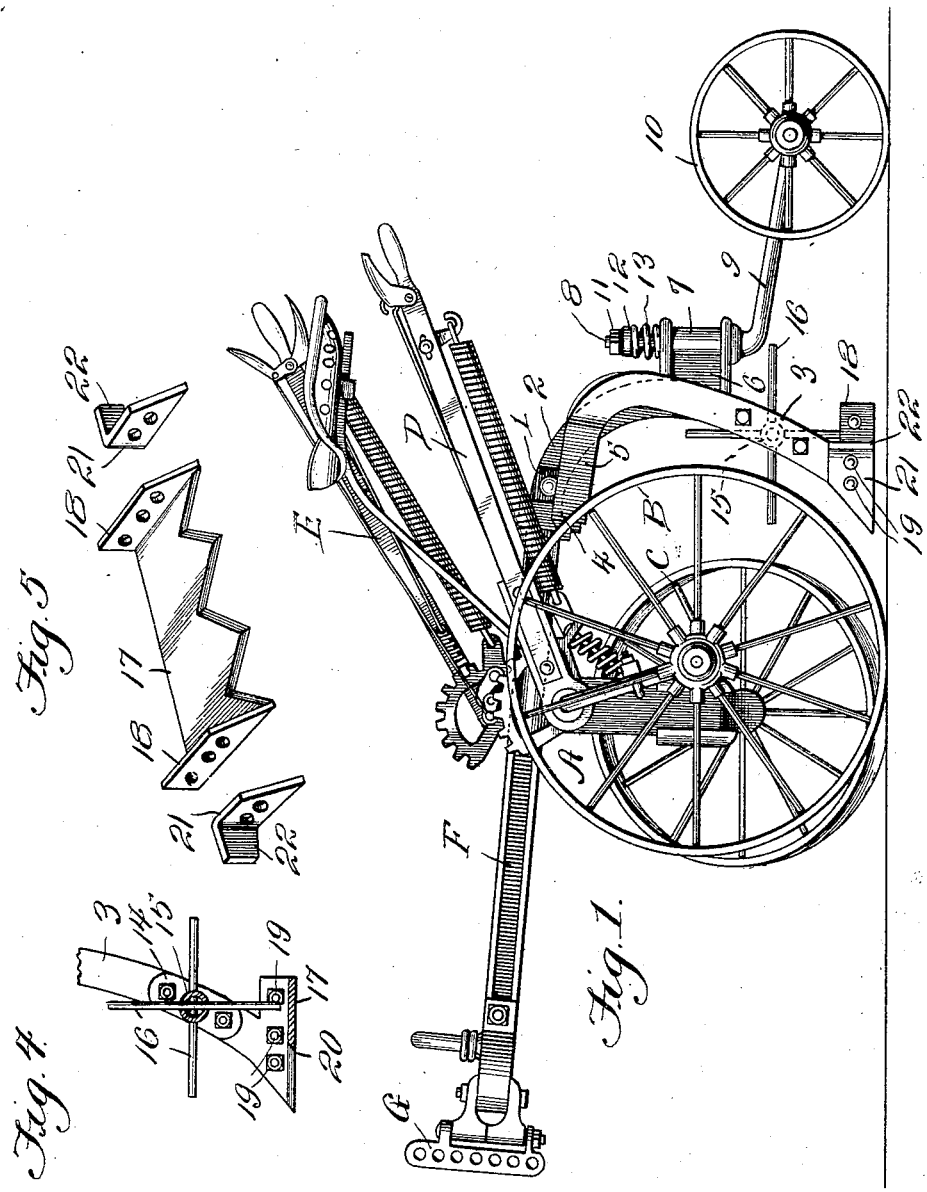

UNITED STATES PATENT OFFICE.

LEWIS FERRIS, OF POCATELLO, IDAHO.

DIGGER.

969,613.	Specification of Letters Patent.	Patented Sept. 6, 1910.

Application filed May 20, 1910. Serial No. 562,466.

*To all whom it may concern:*

Be it known that I, LEWIS FERRIS, a citizen of the United States of America, residing at Pocatello, in the county of Bannock and State of Idaho, have invented new and useful Improvements in Diggers, of which the following is a specification.

This invention relates to diggers for cultivating crops and for stirring and agitating the soil, and it has for its object to produce a digger which shall be particularly useful in cultivating crops on irrigated lands.

A further object of the invention is to produce a simple and efficient machine for undercutting the soil so as to destroy the roots of weeds and the like and for forming shallow ditches adjacent to the growing crops, the soil excavated in the formation of said ditches being thrown in the direction of the growing plants, and said ditches being useful for irrigating purposes.

A further object of the invention is to produce a machine of the character outlined above which shall be simple in construction and thoroughly efficient in operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings, Figure 1 is a side elevation of a machine constructed in accordance with the invention. Fig. 2 is a top plan view, the transporting wheels and parts relating to the adjustment of said wheels having been removed. Fig. 3 is a transverse vertical sectional view taken on the line 3—3 in Fig. 2. Fig. 4 is a vertical sectional detail view taken on the line 4—4 in Fig. 3. Fig. 5 is a perspective view of one of the subsoiling shovels, showing the ditch forming members detached and separate.

Corresponding parts in the several figures are denoted by like characters of reference.

The frame A of the improved machine having the transporting wheels B, C and adjusting means for said wheels including the levers D, E, may be an ordinary sulky plow frame of well known construction, the same requiring no detailed description. The beam F connected with said frame may be an ordinary straight beam provided at its forward end with draft attaching means such as a clevis G. A tongue and a draft evener may also be used, but it has not been deemed necessary to illustrate the same. Firmly bolted upon or otherwise secured to the beam F adjacent to the rear end of the latter are two outwardly offset arms 1, 1 having downwardly extending curved or arcuate standards 2, 2. Similar standards 3, 3 are formed at the outer ends of arms 4, 4 extending from and firmly clamped or secured upon the beam F, slightly in advance of the arms 1, 1, said arms 4 being provided with offsets 5, whereby the standards 2, 2 and 3, 3 are disposed in alinement transversely of the machine. Two pairs of standards are thus formed, each pair being composed of an inner standard 2 and an outer standard 3, and the inner standards being suitably spaced apart so that a row of plants may be straddled thereby. Secured upon the standards 2, 2 are rearwardly extending brackets 6, 6, each having a terminal socket 7 for the accommodation of a shaft 8 having a rearwardly extending arm 9 carrying a trailing wheel 10, the shaft 8 being provided adjacent to its upper end with a nut 11 and a washer 12, between which and the upper end of the socket 7 a spring 13 is interposed to cushion the movement of the trailers. The standards 2, 3 are provided upon their opposed faces with bearings 14 wherein shafts 15 are supported for rotation, said shafts being provided with radially extending arms 16.

Secured upon the lower ends of each pair of standards is a shovel 17 provided adjacent to the sides thereof with upturned flanges 18 for the passage of the bolts or fastening members 19. Said shovels are composed of flat blades of steel, the front edges of which are provided with notches, whereby sharp pointed teeth 20 are formed, said teeth being beveled to form sharp cutting edges. Ditching shoes 21 are firmly secured adjacent to the outer faces of the flanges 18 by means of the fastening members 19, said shoes consisting of plates provided with laterally extending flanges 22.

For the purpose of reinforcing the construction, the standard carrying arms 4 are connected with the frame bar 23 by means of braces 24, as best seen in Fig. 2. Said frame bar also carries a seat support consisting of a spring or bar 25, a portion of which appears in Fig. 2.

In the operation of this device, it is intended that each pair of standards 2, 3 shall operate between a row of growing plants. The blades 17 will cut beneath the soil, thus severing the roots of weeds and obnoxious plants, the soil thus loosened being stirred and agitated by the radial digger arms 16 extending from the shafts 15 which are rotated by contact with the soil as the machine progresses. The ditching shoes will serve to form narrow trenches adjacent to the rows of plants which will conduct the irrigation water close to the roots of the plants where it will be applied with the best results. By raising or lowering the frame with reference to the transporting wheels, the depth of the cultivation may be regulated.

Having thus described the invention, what is claimed as new, is:—

1. In a device of the character described, a sulky frame, a beam connected therewith, a pair of standards connected with the beam, a flat blade having a sharp toothed front edge and upturned flanges secured upon the lower ends of the standards, and ditching shoes supported adjacent to the sides of the flat blade.

2. In a device of the character described, a sulky frame, a beam connected therewith, a pair of standards connected with the beam, a blade having upturned flanges secured upon the standards, and ditching shoes secured adjacent to the sides of the blade and having laterally extending flanges.

3. In a device of the character described, a sulky frame, a beam connected therewith, a pair of standards connected with the beam, a blade having upturned flanges secured upon the standards, ditching shoes secured adjacent to the sides of the blade, and a shaft supported for rotation upon the standards above the blade and having agitating arms extending radially therefrom.

In testimony whereof I affix my signature in presence of two witnesses.

LEWIS FERRIS.

Witnesses:
BEN. CASTELLINI,
JOS. A. MAURO.